(12) United States Patent
Liu et al.

(10) Patent No.: US 11,948,034 B2
(45) Date of Patent: Apr. 2, 2024

(54) ELECTRONIC CARD STRUCTURE WITH DECORATION

(71) Applicant: BEAUTIFUL CARD CORPORATION, Taoyuan (TW)

(72) Inventors: Jen-Hsiang Liu, Taoyuan (TW); Jung-Hsiu Chen, Taoyuan (TW)

(73) Assignee: BEAUTIFUL CARD CORPORATION, Taoyuan (TW)

( * ) Notice: Subject to any disclaimer, the term of this patent is extended or adjusted under 35 U.S.C. 154(b) by 0 days.

(21) Appl. No.: 18/080,755

(22) Filed: Dec. 14, 2022

(65) Prior Publication Data

US 2023/0409859 A1 Dec. 21, 2023

(30) Foreign Application Priority Data

Jun. 16, 2022 (TW) .................................. 111122494

(51) Int. Cl.
*G06K 19/06* (2006.01)
*G06K 19/077* (2006.01)

(52) U.S. Cl.
CPC .............................. *G06K 19/07705* (2013.01)

(58) Field of Classification Search
CPC ................................................ G06K 19/07705
See application file for complete search history.

(56) References Cited

U.S. PATENT DOCUMENTS

2021/0158124 A1* 5/2021 Lowe ............... G06K 19/06121

* cited by examiner

*Primary Examiner* — Jamara A Franklin

(57) ABSTRACT

An electronic card structure with decorations includes a card body, an electrical control module and a decoration module. The card body includes a panel, a bottom plate and a through hole portion. The electrical control module is disposed in the card body. The electrical control module includes a circuit control carrier plate and a non-contact type radio-frequency antenna or a contact type communication chip. The decoration module is disposed in the card body. The decoration module includes a transparent casing and a decoration. The transparent casing is disposed at the panel through the through hole portion. The decoration is disposed in the transparent casing. Therefore, owing to the decoration module, the electronic card is pleasing in appearance, has high commemorative value, and is worth collection.

4 Claims, 6 Drawing Sheets

ELECTRONIC CARD STRUCTURE WITH DECORATION

CROSS-REFERENCE TO RELATED APPLICATION

This non-provisional application claims priority under 35 U.S.C. § 119(a) on Patent Application No(s). 111122494 filed in Taiwan, R.O.C. on Jun. 16, 2022, the entire contents of which are hereby incorporated by reference.

BACKGROUND OF THE INVENTION

1. Field of the Invention

The present disclosure relates to electronic cards, and in particular to an electronic card that is pleasing in appearance, has high commemorative value, and is worth collection.

2. Description of the Related Art

Conventionally portable electronic cards, such as debit cards, credit cards, prepaid cards, public transport smart cards, health insurance cards, and smart ID cards, fall into two categories, namely contact type and non-contact type, depending on how they work. The contact type card has its chip exposed from the card and adapted to come into electrical contact with an external card reader, allowing the card reader to read required data in the chip to carry out a transaction. By contrast, an induction coil and an RFID tag thereof are embedded in the non-contact type card. When a user places the non-contact type card near a reading module, electric power is generated as a result of mutual inductance between an antenna of the reading module and the induction coil of the card, allowing the reading module to read data of the RFID tag to carry out a transaction.

However, the contents shown on both the front side and back side of the card body of the conventional electronic card are standardized and monotonous. For example, the front side usually shows the trademark of the card issuer (or the issuing bank), and the theme picture/text of the card. The back side usually provide the space for the card holder's signature and notes. As a result, the conventional electronic card looks tediously repetitious and lacks aesthetic variety.

Therefore, it is necessary to provide an electronic card structure with decorations so that the electronic card is pleasing in appearance, has high commemorative value, and is worth collection.

BRIEF SUMMARY OF THE INVENTION

In view of the aforesaid drawback of the prior art, it is an objective of the disclosure to provide an electronic card structure with decorations so that the electronic card is pleasing in appearance, has high commemorative value, and is worth collection.

In order to achieve the above and other objectives, the disclosure provides an electronic card structure with decorations, comprising a card body, an electrical control module and a decoration module. The card body comprises a panel and a bottom plate. The panel is disposed on top of the bottom plate. The panel has a through hole portion. The electrical control module is disposed in the card body. The electrical control module comprises a circuit control carrier plate and a non-contact type radio-frequency antenna or a contact type communication chip. The non-contact type radio-frequency antenna is disposed at the circuit control carrier plate, or the contact type communication chip is disposed at the circuit control carrier plate. The decoration module is disposed in the card body. The decoration module comprises a transparent casing and a decoration. The transparent casing is disposed at the panel through the through hole portion. The decoration is disposed in the transparent casing.

Regarding the electronic card structure with decorations, the panel has a panel graphical portion, and the bottom plate has a bottom plate graphical portion.

Regarding the electronic card structure with decorations, the transparent casing has a receiving portion and a periphery portion. The periphery portion is disposed on the periphery of the receiving portion. The receiving portion is disposed at the panel through the through hole portion. The periphery portion is confined to the bottom side of the panel.

Regarding the electronic card structure with decorations, the circuit control carrier plate is disposed between the panel and the bottom plate, and the decoration module is disposed between the panel and the circuit control carrier plate, with a supporting frame-shaped plate disposed between the panel and the circuit control carrier plate, wherein the supporting frame-shaped plate and the periphery portion are of equal thickness and have an intervening adhesive layer.

Regarding the electronic card structure with decorations, the circuit control carrier plate is light-penetrable, and the bottom plate has a corresponding transparent portion corresponding in position to a bottom side of the receiving portion.

The electronic card structure with decorations further comprises a light-emitting module and a light-guiding module, the light-emitting module being disposed in the card body and electrically connected to the circuit control carrier plate, and the light-guiding module being disposed in the card body and corresponding in position to the decoration module and the light-emitting module.

Regarding the electronic card structure with decorations, a first light-penetrable border portion and a first shading portion are disposed on a periphery of the panel, with the first light-penetrable border portion being disposed on a periphery of the first shading portion, wherein a second light-penetrable border portion and a second shading portion are disposed on a periphery of the bottom plate, with the second light-penetrable border portion being disposed on a periphery of the second shading portion, with the first light-penetrable border portion being coupled to the second light-penetrable border portion, wherein light emitted from the light-emitting module is guided by the light-guiding module to the first light-penetrable border portion, the second light-penetrable border portion and the decoration module.

Therefore, owing to the decoration module, the electronic card structure with decorations is pleasing in appearance, has high commemorative value, and is worth collection.

DETAILED DESCRIPTION OF THE INVENTION

Objectives, features, and advantages of the disclosure are hereunder illustrated with specific embodiments, depicted with accompanying drawings, and described below.

Figure 1:
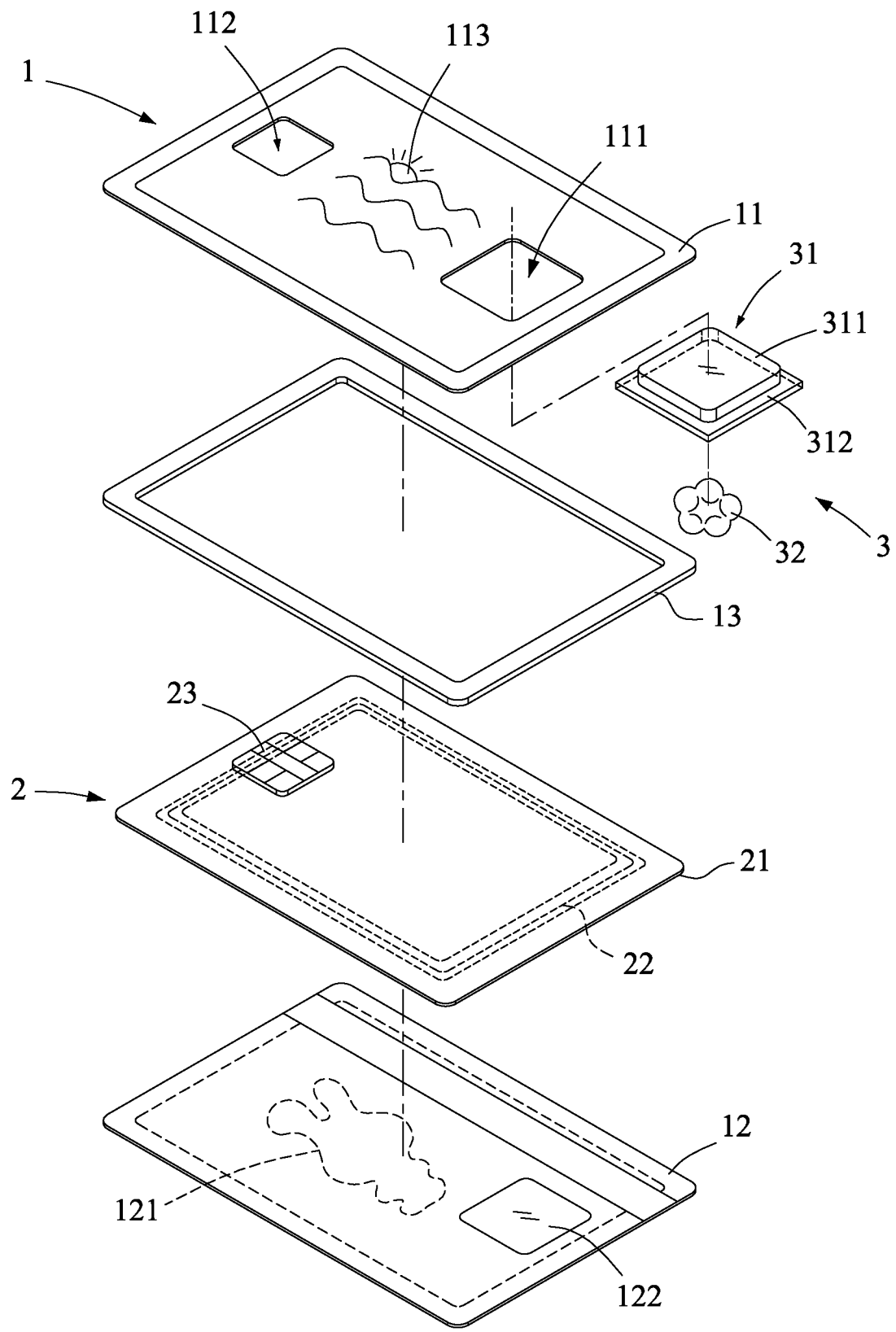
FIG. 1 is an exploded view of an electronic card structure with decorations according to the first preferred specific embodiment of the disclosure.
Figure 2:
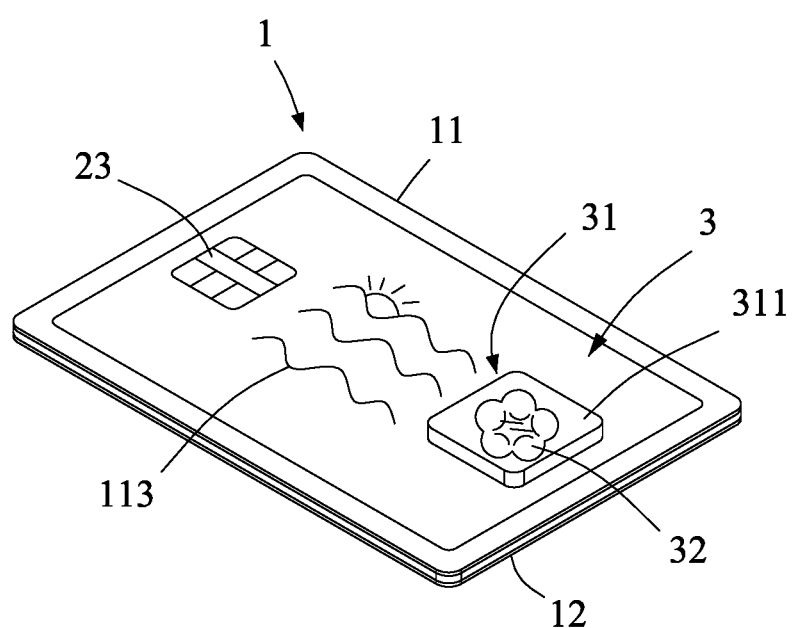
FIG. 2 is a perspective view of the electronic card structure with decorations according to the first preferred specific embodiment of the disclosure.
Figure 3:
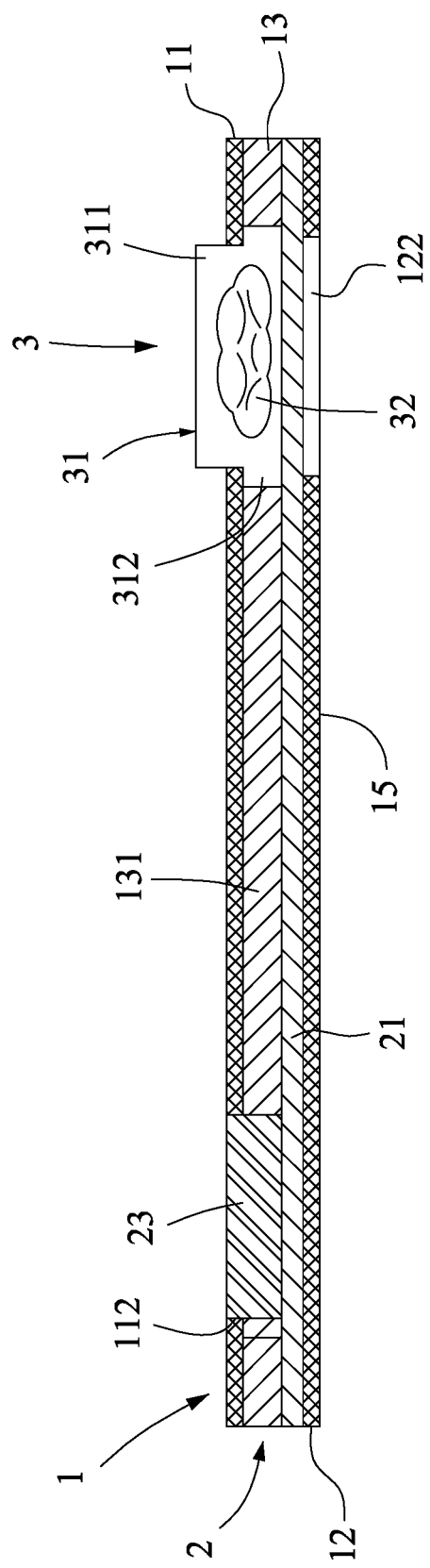
FIG. 3 is a cross-sectional view of the electronic card structure with decorations according to the first preferred specific embodiment of the disclosure.
Figure 4:
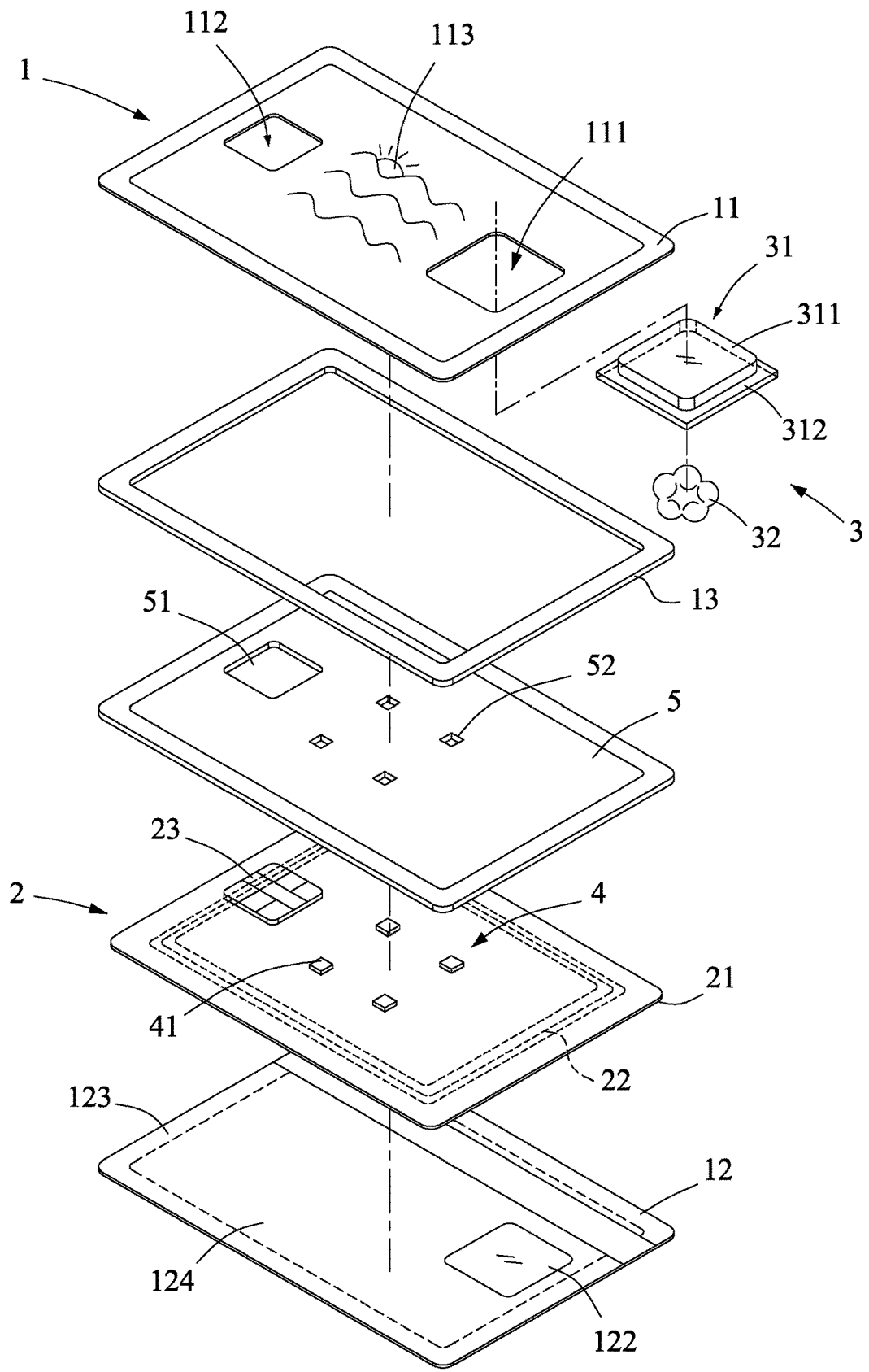
FIG. 4 is an exploded view of the electronic card structure with decorations according to the second preferred specific embodiment of the disclosure.

Referring to FIG. 1 through FIG. 3, the disclosure provides an electronic card structure with decorations, comprising a card body 1, an electrical control module 2 and a decoration module 3.

The card body 1 comprises a panel 11 and a bottom plate 12. The panel 11 is disposed on top of the bottom plate 12. The panel 11 has a through hole portion 111.

The electrical control module 2 is disposed in the card body 1. The electrical control module 2 comprises a circuit control carrier plate 21 and a non-contact type radio-frequency antenna 22 or a contact type communication chip 23. The non-contact type radio-frequency antenna 22 is disposed at the circuit control carrier plate 21; alternatively, the contact type communication chip 23 is disposed at the circuit control carrier plate 21. The non-contact type radio-frequency antenna 22 and the contact type communication chip 23 are concurrently disposed at the circuit control carrier plate 21.

The decoration module 3 is disposed in the card body 1. The decoration module 3 comprises a transparent casing 31 and a decoration 32. The transparent casing 31 is disposed at the panel 11 through the through hole portion 111 in a way to allow the transparent casing 31 to be taller than, flush with or shorter than the panel. The decoration 32 is disposed in the transparent casing 31.

To carry out exchange of personal data or transaction data with the card body 1, a user places the card body 1 near a reading module (not shown) or inserts the card body 1 into the reading module so as for the electrical control module 2 to be powered by electric power from the reading module, allowing the exchange of personal data or transaction data to take place between the electrical control module 2 and the reading module.

Owing to the joint operation of the transparent casing 31 and the decoration 32 of the decoration module 3 while the card body 1 is in use (as described above) or not in use, the electronic card is pleasing in appearance, has high commemorative value, and is worth collection.

In an embodiment of the disclosure, the panel 11 has an opening portion 112 corresponding in position to the contact type communication chip 23 so that the contact type communication chip 23 disposed at the card body 1 is exposed therefrom to come into contact with the reading module and be powered thereby, facilitating exchange of personal data or transaction data.

In an embodiment of the disclosure, the panel 11 has a panel graphical portion 113. The bottom plate 12 has a bottom plate graphical portion 121. Thus, owing to the joint operation of the panel graphical portion 113, the bottom plate graphical portion 121, the transparent casing 31 and the decoration 32, the electronic card is pleasing in appearance, has high commemorative value, and is worth collection.

In an embodiment of the disclosure, the transparent casing 31 has a receiving portion 311 and a periphery portion 312. The periphery portion 312 is disposed on the periphery of the receiving portion 311. The receiving portion 311 is disposed on the surface of the panel 11 through the through hole portion 111 in a way to allow the receiving portion 311 to be taller than, flush with or shorter than the panel. The periphery portion 312 is confined to the bottom side of the panel 11. Thus, owing to the periphery portion 312, the decoration module 3 is firmly mounted on the panel 11 of the card body 1 to prevent separation of the decoration module 3 and the panel 11.

In an embodiment of the disclosure, the circuit control carrier plate 21 is disposed between the panel 11 and the bottom plate 12. The decoration module 3 is disposed between the panel 11 and the circuit control carrier plate 21. A supporting frame-shaped plate 13 is disposed between the panel 11 and the circuit control carrier plate 21. The supporting frame-shaped plate 13 and the periphery portion 312 are of the same thickness. An adhesive layer 131 is disposed between the supporting frame-shaped plate 13 and the periphery portion 312. Thus, during the manufacturing process of the electronic card, both the supporting frame-shaped plate 13 and the adhesive layer 131 function as a pad of the panel 11 to prevent the surface of the panel 11 from sagging because of the periphery portion 312, and in consequence both the supporting frame-shaped plate 13 and the adhesive layer 131 keep the panel 11 flat and attractive.

In an embodiment of the disclosure, the circuit control carrier plate 21 is light-penetrable. The bottom plate 12 has a corresponding transparent portion 122 corresponding in position to the bottom side of the receiving portion 311. Thus, both the panel 11 (front side) and bottom plate 12 (back side) of the electronic card display the decoration 32 of the decoration module 3 so that the electronic card is pleasing in appearance, has high commemorative value, and is worth collection.

Figure 5:
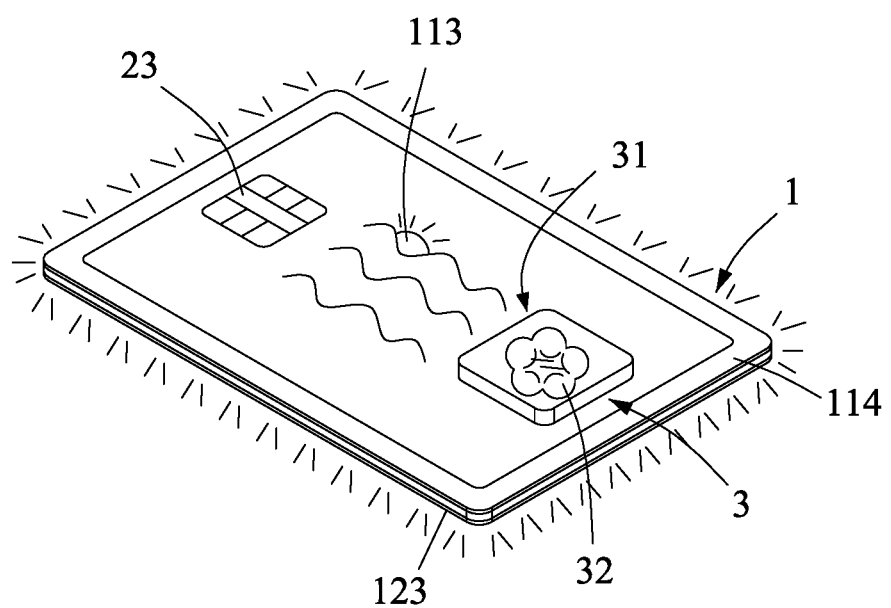
FIG. 5 is a perspective view of the electronic card structure with decorations according to the second preferred specific embodiment of the disclosure.
Figure 6:
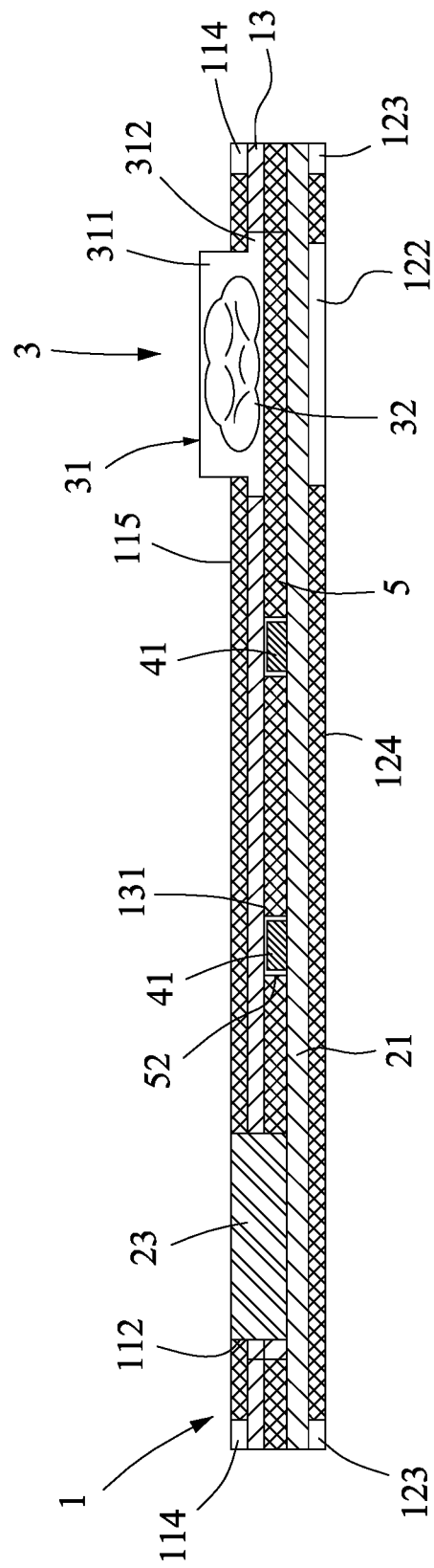
FIG. 6 is a cross-sectional view of the electronic card structure with decorations according to the second preferred specific embodiment of the disclosure.

Referring to FIG. 5 and FIG. 6, this embodiment is distinguished from the preceding embodiment in that the card body 1 further comprises a light-emitting module 4 and a light-guiding module 5. The light-emitting module 4 is disposed in the card body 1 and electrically connected to the circuit control carrier plate 21. The light-guiding module 5 is disposed in the card body 1 and corresponds in position to the decoration module 3 and the light-emitting module 4.

In an embodiment of the disclosure, a first light-penetrable border portion 114 and a first shading portion 115 are disposed on the periphery of the panel 11. The first light-penetrable border portion 114 is disposed on the periphery of the first shading portion 115. Both a second light-penetrable border portion 123 and a second shading portion 124 are disposed on the periphery of the bottom plate 12. The second light-penetrable border portion 124 is disposed on the periphery of the second shading portion 123. The first light-penetrable border portion 145 is coupled to the second light-penetrable border portion 124. The supporting frame-shaped plate 13 also serves a light-guiding purpose so that the light emitted from the light-emitting module 4 is guided by the light-guiding module 5 to the first light-penetrable border portion 114, the second light-penetrable border portion 123 and the decoration module 3.

To carry out exchange of personal data or transaction data with the card body 1, the user places the card body 1 near the reading module so that the electrical control module 2 is powered by electrical power from the reading module through the non-contact type radio-frequency antenna 22. Alternatively, to carry out exchange of personal data or transaction data with the card body 1, the user inserts the card body 1 into the reading module so that the electrical control module 2 is powered by electrical power from the reading module through the contact type communication chip 23. Thus, the electrical control module 2 undergoes personal data or transaction data exchange with the reading module through the circuit control carrier plate 21 and the non-contact type radio-frequency antenna 22 or through the circuit control carrier plate 21 and the contact type communication chip 23. Furthermore, the electrical control module 2 thus powered can drive the light-emitting module 4 so that light is emitted from the light-emitting components 41 of the light-emitting module 4 but masked by the first shading portion 115 and the second shading portion 124. As a result, the light is guided by the light-guiding module 5 to the first light-penetrable border portion 114 and the second light-penetrable border portion 123 and guided by the light-guiding module 5 to the transparent casing 31 so that both the periphery of the card body 1 and the decoration module 3 can emit display light to not only inform and remind the user of the ongoing exchange of personal data or transaction data but also enable the electronic card to be pleasing in appearance, have high commemorative value, and be worth collection.

Both the panel 11 and the bottom plate 12 are made of transparent ABS, PETG, PVC or PET, whereas the first shading portion 115 and the second shading portion 124 are made of shading ink. Thus, with light beams being effectively masked by the first shading portion 115 and the second shading portion 124, light is precisely guided by the light-guiding module 5 to the first light-penetrable border portion 114, the second light-penetrable border portion 123 and the decoration module 3.

Both the first shading portion 115 and the second shading portion 124 can be provided in the form of a full-scale opaque masking layer. Alternatively, the panel graphical portion 113 and the bottom plate graphical portion 121 are disposed on top of the first shading portion 115 and the second shading portion 124, respectively, allowing the card body 1 to meet practical needs.

In an embodiment of the disclosure, the light-guiding module 5 is made of transparent PVC, PET, PC or PMMA and thus meets various usage needs.

In an embodiment of the disclosure, the panel 11 and the light-guiding module 5 have the opening portions 112, 51 corresponding in position to the contact type communication chip 23, respectively, to not only allow the contact type communication chip 23 to be disposed at the card body 1 and exposed therefrom, but also allow the contact type communication chip 23 to come into contact with the reading module to receive electric power therefrom, so as to carry out exchange of personal data or transaction data.

In an embodiment of the disclosure, the light-emitting module 4 has one or a plurality of light-emitting components 41. The light-guiding module 5 has one or a plurality of through holes 52 for receiving the light-emitting components 41. In a preferred embodiment of the disclosure, the light-emitting module 4 has four light-emitting components 41 arranged in a matrix, and the light-guiding module 5 has four through holes 52 for receiving the light-emitting components 41, respectively. Thus, light is emitted from the light-emitting components 41 but masked by the first shading portion 115 and the second shading portion 124 to allow the light to be precisely guided by the light-guiding module 5 to the first light-penetrable border portion 114, the second light-penetrable border portion 123 and the decoration module 3 so as for the periphery of the card body 1 to emit uniform display light to not only inform and remind the user of the ongoing exchange of personal data or transaction data but also enable the electronic card to be pleasing in appearance, have high commemorative value, and be worth collection.

In an embodiment of the disclosure, the light-emitting components 41 are LEDs so that the light-emitting module 4 is advantageously energy-efficient, compact and highly plastic, allowing the card body 1 to meet practical needs.

The invention is illustrated by preferred embodiments and described above. However, persons skilled in the art understand that the embodiments merely serve an illustrative purpose but must not be interpreted to place limitations on the scope of the invention. All equivalent changes and replacements made to the embodiments must be deemed falling within the scope of the invention. Therefore, the legal protection for the invention must be defined by the appended claims.

What is claimed is:

1. An electronic card structure with decorations, comprising:
   a card body comprising a panel and a bottom plate, the panel being disposed on top of the bottom plate and having a through hole portion;
   an electrical control module disposed in the card body and comprising a circuit control carrier plate and a non-contact type radio-frequency antenna or a contact type communication chip, the non-contact type radio-frequency antenna being disposed at the circuit control carrier plate, or the contact type communication chip being disposed at the circuit control carrier plate; and
   a decoration module disposed in the card body and comprising a transparent casing and a decoration, the transparent casing being disposed at the panel through the through hole portion, and the decoration being disposed in the transparent casing,
   wherein the transparent casing has a receiving portion and a periphery portion, the periphery portion being disposed on a periphery of the receiving portion and confined to a bottom side of the panel, and the receiving portion being disposed at the panel through the through hole portion, and
   wherein the circuit control carrier plate is disposed between the panel and the bottom plate, and the decoration module is disposed between the panel and the circuit control carrier plate, with a supporting frame-shaped plate disposed between the panel and the circuit control carrier plate, wherein the supporting frame-shaped plate and the periphery portion are of equal thickness and have an intervening adhesive layer.

2. The electronic card structure with decorations according to claim 1, wherein the panel has a panel graphical portion, and the bottom plate has a bottom plate graphical portion.

3. The electronic card structure with decorations according to claim 1, wherein the circuit control carrier plate is light-penetrable, and the bottom plate has a corresponding transparent portion corresponding in position to a bottom side of the receiving portion.

4. An electronic card structure with decorations, comprising:
   a card body comprising a panel and a bottom plate, the panel being disposed on top of the bottom plate and having a through hole portion;

an electrical control module disposed in the card body and comprising a circuit control carrier plate and a non-contact type radio-frequency antenna or a contact type communication chip, the non-contact type radio-frequency antenna being disposed at the circuit control carrier plate, or the contact type communication chip being disposed at the circuit control carrier plate;

a decoration module disposed in the card body and comprising a transparent casing and a decoration, the transparent casing being disposed at the panel through the through hole portion, and the decoration being disposed in the transparent casing; and a light-emitting module and a light-guiding module, the light-emitting module being disposed in the card body and electrically connected to the circuit control carrier plate, and the light-guiding module being disposed in the card body and corresponding in position to the decoration module and the light-emitting module, wherein a first light-penetrable border portion and a first shading portion are disposed on a periphery of the panel, with the first light-penetrable border portion being disposed on a periphery of the first shading portion, wherein a second light-penetrable border portion and a second shading portion are disposed on a periphery of the bottom plate, with the second light-penetrable border portion being disposed on a periphery of the second shading portion, with the first light-penetrable border portion being coupled to the second light-penetrable border portion, wherein light emitted from the light-emitting module is guided by the light-guiding module to the first light-penetrable border portion, the second light-penetrable border portion and the decoration module.

* * * * *